Oct. 6, 1925.
R. B. ABELL
1,556,467
BEARING BUSHING
Filed Jan. 26, 1923
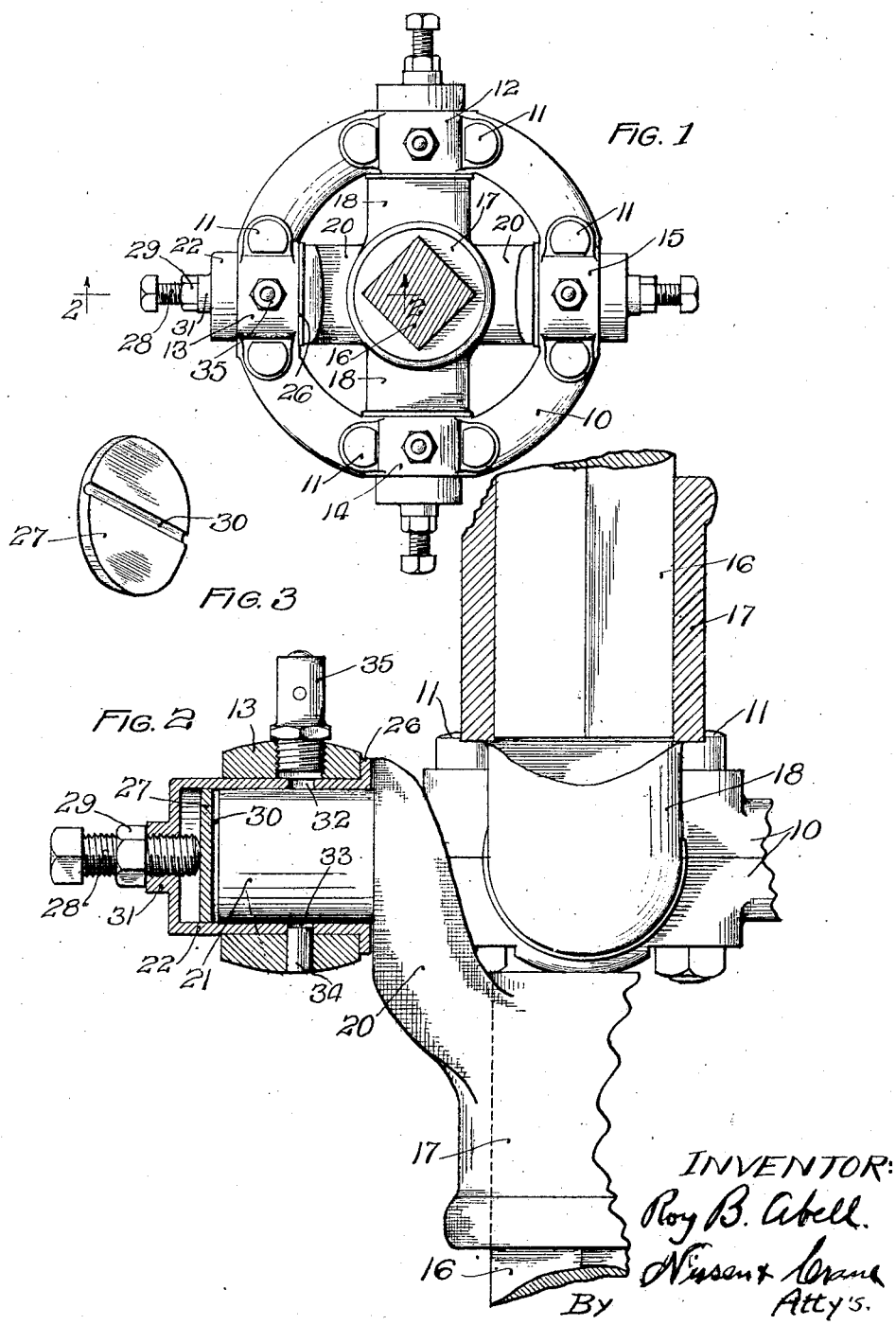
INVENTOR:
Roy B. Abell.
Nissen & Crane
By Atty's.

Patented Oct. 6, 1925.

1,556,467

UNITED STATES PATENT OFFICE.

ROY B. ABELL, OF VANCOUVER, BRITISH COLUMBIA, CANADA, ASSIGNOR OF ONE-HALF TO EDWIN BAGNALL, OF TORONTO, CANADA.

BEARING BUSHING.

Application filed January 26, 1923. Serial No. 614,968.

*To all whom it may concern:*

Be it known that I, ROY B. ABELL, a citizen of the Dominion of Canada, residing at Vancouver, in the Province of British Columbia, Canada, have invented certain new and useful Improvements in Bearing Bushings, of which the following is a specification.

This invention relates to bushings for bearings of various kinds, such for example, as the bearings of a universal joint, and has for its object the provision of such a device which can be adjusted to prevent play and avoid wear, and which shall be of improved construction and operation.

The invention is exemplified in the combination and arrangement of parts shown in the accompanying drawing and described in the following specification, and it is more particularly pointed out in the appended claims.

In the drawings,

Fig. 1 is a transverse sectional view of an automobile drive shaft, showing the universal joint bearing therefor in elevation and illustrating one application of the present invention.

Fig. 2 is a fragmentary section on line 2—2 of Fig. 1.

Fig. 3 is a perspective view of an adjustable disk forming part of the present invention.

In many bearings and especially bearings subjected to stresses which vary in their direction, difficulties have been experienced in preventing excessive wear. If the direction of the stresses on the bearing varies at frequent periodic intervals the least looseness will result in a relative movement of the parts at each shift in the direction of the stresses, so that as soon as wear begins to loosen the bearing the resulting looseness will magnify the amount of wear and as a result the bearings are soon destroyed. A conspicuous example of this difficulty is present in universal joints for shafts which operate at an angle to one another and especially to shafts subjected to heavy strains such as those of automobiles and automobile trucks.

A bearing of this kind having the present invention applied thereto is shown in the drawing, in which the numeral 10 designates a split ring of a universal joint of well known construction. The parts of the ring are secured together by bolts 11 which are arranged at opposite sides of four bearings 12, 13, 14 and 15. The shaft 16 is received in the squared opening in an eye 17 connected by arms 18 with trunnions 19 received in the bearings 12 and 14. Similar arms 20 have trunnions 21 journaled in the bearings 13 and 15. Bushings 22 are clamped between the halves of the bearings by the bolts 11 and surround the trunnions, providing bearing surfaces therefor. Each of the bushings 22 is provided with a flange 23, which fits against the inner end of its bearing and limits the outward movement of the bushing. Positioned within each of the bushings 22 is a disk 27, held in place against the end of the trunnion by a setscrew 28 and lock nut 29. The inner faces of the disks 27 are provided with grooves 30 to facilitate lubrication of the bearing surface of the disk and the end of the trunnion 21. The set-screw 28 is threaded into a boss 31 in the end of the bushing 22. The lateral walls of the bushings may be perforated by openings 32 for admitting lubrication and 33 for receiving pins 34 to hold the bushings against rotation. Oil cups 35 are provided for admitting lubrication to the bearings.

In a joint of this kind it is important that the ring 10 be centered relative to the intersection of the axes of the two shafts. If any play is permitted in the bearings it will result not only in wear on the surfaces which receive the end thrust, but lateral movement of one shaft relative to the axis of the other tends to bind the bearings, causing the trunnions to bear unevenly against the inner faces of the bushings and so wear depressions in these faces. In practice it has been found that as soon as a slight endwise movement of the trunnion is permitted the lateral wear on the inner faces of the bushings is rapidly accelerated and the bushings soon become so misshaped that the joint is soon entirely out of commission.

In the present invention the adjustable disks 27 permit accurate adjustment of the position of the trunnions 21 in the direction of their axes, thus properly aligning the shafts and providing against endwise play. It has been found that where proper adjustment of this kind is made when the bearing is first installed the life of the joint is greatly increased before any looseness is noticeable, and if the bearing is readjusted in case any looseness appears the life of the joint is many times that of a joint in which no adjustment is provided for. By properly caring for the end thrust on the bearings the trunnions run true in their bushings and the wear on the sides of the bushings is prevented, thus avoiding any necessity for lateral adjustments relative to the axes of the trunnions.

I claim:

1. In a bearing, a supporting member, a hollow cylindrical bushing seated in said supporting member and having a closed end, a trunnion journaled in said bushing, a disc arranged within said bushing between said trunnion and the closed end of said bushing and movable relative to said end in the direction of the axis of said trunnion, and a threaded member for moving said disc toward said trunnion, said threaded member being arranged to retain said disc in its adjusted positions against the force exerted thereon by said trunnion.

2. A bearing comprising a supporting member having an opening therein, a bushing seated in said opening and having a flange thereon for holding said bushing against movement in one direction, a trunnion journaled in said bushing, a set-screw threaded in said bushing at the end thereof opposite said flange, a lock nut on said set-screw, and a bearing disk arranged within said bushing between the end of said trunnion and said set-screw and adjustably held against said trunnion by said set-screw.

3. A shaft coupling comprising a bearing member having pairs of oppositely disposed bearings therein, a pair of fittings separate from one another and from said bearing member, each fitting having a pair of trunnions journaled in said bearings, shafts separate from said bearing member and rigidly connected with said fittings, bushings for said bearings having their outer ends closed, and adjustable means within said bushings for receiving the end thrust of said trunnions.

4. A flexible shaft coupling comprising a member having pairs of oppositely disposed bearings therein, a pair of fittings separate from one another and from said member, each having trunnions journaled in said bearings, bushings in said bearings for receiving said trunnions, said bushings having their outer ends closed, and bearing discs within said bushings and adjustable relative thereto in the direction of the axes of said trunnions for engaging the ends of said trunnions and resisting end thrust thereon.

5. A flexible shaft coupling comprising a ring having pairs of oppositely disposed bearings therein, bifurcated fittings separate from said ring, each having trunnions on the bifurcations thereof journaled in said bearings, angularly disposed shafts connected one with each of said fittings, bushings in said bearings for receiving said trunnions, disks disposed loosely in said bushings adjacent the ends of said trunnions, threaded members for adjusting said bushings relative to the ends of said trunnions to resist endwise thrust thereon and means for locking said threaded members in any position of adjustment thereof.

6. In a universal joint, a coupler member, shafts each having a journal bearing connection with said coupler member at right angles to the axis of the shafts, adjustable means for resisting end thrust on said bearing connections said adjustable means comprising a disc freely slidable within said bearings, threaded members for sliding said disc, and means for locking said threaded members in their different positions of adjustment.

7. In a universal joint, a coupler member, shafts each having a journal bearing connection with said coupler member comprising a trunnion and bushing, a bearing disk in each bushing adjacent the end of the trunnion and limited in its movement toward said trunnion by the end of said trunnion only regardless of the position of said trunnion in said bushing, and adjustable means for holding the disks against the ends of the trunnions.

In testimony whereof I have signed my name to this specification on this 28th day of December A. D. 1922.

ROY B. ABELL.